United States Patent [19]

Johnson et al.

[11] Patent Number: 5,041,260
[45] Date of Patent: Aug. 20, 1991

[54] RESIN TRANSFER MOLDING METHOD

[75] Inventors: Carl F. Johnson, New Boston; Norman G. Chavka, Allen Park, both of Mich.

[73] Assignee: Ford Motor Company, Dearborn, Mich.

[21] Appl. No.: 429,112

[22] Filed: Oct. 30, 1989

[51] Int. Cl.⁵ .............................................. B29C 45/14
[52] U.S. Cl. .................................... 264/510; 264/517; 264/112; 264/257
[58] Field of Search .............. 428/283, 284, 542.8, 428/34.5, 68, 304.4, 74; 264/510, 511, 517, 518, 112, 230, 257, 328.1

[56] References Cited

U.S. PATENT DOCUMENTS

| | | | |
|---|---|---|---|
| 3,054,714 | 9/1962 | Johnston | 264/510 |
| 3,186,895 | 6/1965 | MacDonald | 264/510 |
| 3,382,125 | 5/1968 | Lowdermilk | 264/511 |
| 3,708,563 | 1/1973 | Sells | 264/45 |
| 3,796,617 | 3/1974 | Wiltshire | 264/517 |
| 3,825,642 | 7/1974 | Kies | 264/112 |
| 3,887,750 | 6/1975 | Duckett et al. | 428/297 |
| 3,925,528 | 12/1975 | Müller et al. | 264/54 |
| 3,962,394 | 6/1976 | Hall | 264/510 |
| 4,032,683 | 6/1977 | Coale | 428/315 |
| 4,556,438 | 12/1985 | Hoffmeister et al. | 156/79 |
| 4,560,523 | 12/1985 | Plumley et al. | 264/102 |
| 4,676,041 | 6/1987 | Ford | 52/309.11 |
| 4,808,362 | 2/1989 | Freeman | 264/257 |
| 4,863,771 | 9/1989 | Freeman | 428/36.1 |
| 4,869,855 | 9/1989 | Twilley et al. | 264/25 |
| 4,891,176 | 1/1990 | Drysdale et al. | 264/250 |

FOREIGN PATENT DOCUMENTS 502817 12/1954 Italy ............................. 264/517

Primary Examiner—Mary Lynn Theisen
Attorney, Agent, or Firm—Damian Porcari; Clifford L. Sadler

[57] ABSTRACT

A resin transfer molding preform is disclosed comprising a formation of fiber reinforcement material and a web in direct contact with the formation and encapsulating at least a portion thereof, i.e., the web secured or fixed to the fiber reinforcement material mechanically or by adhesion, etc. A method of making certain of the resin transfer molding preforms of the invention comprises spraying random chopped fiber reinforcement material onto a forming member while drawing a vacuum through the forming member, applying a web over at least a portion of the fiber formation while it remains on the forming member, and compressing the fiber reinforcement material under the web to reduce the loft thereof. Also disclosed is a resin transfer molding process employing a preform according to the invention.

7 Claims, 2 Drawing Sheets

RESIN TRANSFER MOLDING METHOD

INTRODUCTION

This invention is directed to resin transfer molding and, more specifically, to a resin transfer molding preform and to a resin transfer molding process employing the same.

BACKGROUND

Resin transfer molding is a closed mold, low pressure molding process, sometimes referred to as liquid molding process, applicable to the fabrication of complex high performance composite articles of both large and small size. Several different resin transfer molding processes are well known to the skilled of the art. The process is differentiated from various other molding processes in that a reinforcement material, such as fiberglass or other fiber reinforcement material, is placed first into a molding tool cavity and then combined with resin within the mold cavity to form a fiber reinforced plastic ("FRP") composite product.

Typically, a pre-shaped fiber reinforcement, sometimes referred to as a reinforcement preform, is positioned within a molding tool cavity and the molding tool is then closed. A feed line connects the closed molding tool cavity with a supply of liquid resin and the resin is pumped or "transferred" into the tool cavity where it impregnates and envelops the fiber reinforcement and subsequently cures. The cured or semi-cured FRP product then is removed from the molding tool cavity. As used herein, the terms resin transfer molding and RTM are used to refer generically to molding processes wherein fiber reinforcement is positioned in a molding tool cavity into which resin is subsequently introduced. Thus, variations such as so-called press molding or squeeze molding, structural reaction injection molding ("SRIM") and the like are within the scope of such terms. Structural reaction injection molding uses a highly reactive resin system comprising two components pumped from separate holding tanks under pressure into an impingement mixing chamber and from there into the molding tool cavity. The tooling typically comprises a metallic shell to facilitate heat transfer. Although the mixing pressure is relatively high, the overall pressure of the resin in the molding tool typically is only about 50–100 psi. The resin flows into the molding tool cavity and wets-out the fiber reinforcement as the curing reaction is occurring. Typically, the fiber reinforcement material can be used in amounts up to about 20–30/weight percent of the fiber plus resin composite. Due to rapid resin cure, flow distances may be limited and for longer flow distances multiple inlet ports may be required.

Another variant of resin transfer molding, referred to generally as high speed resin transfer molding, is particularly suitable for commercial production of products requiring a three dimensional reinforcement preform. Fiber content typically is in the 35–50 weight percent range. Tooling for high production volumes typically is made of steel in order to contain molding pressures of 100–500 psi and for good heat transfer characteristics. For more limited production requirements, aluminum or zinc tooling may be acceptable. Typically, molding is carried out at elevated temperatures to reduce the cure time. The preform is positioned within the molding tool cavity, the mold is closed and resin is injected. At higher reinforcement levels, that is, at higher fiber weight content, the mold may be left slightly opened during resin injection to promote more rapid filling of the molding cavity; the mold cavity would then be fully closed. Preferably, the curing of the resin is accomplished in the mold such that the product will require no post-bake cycle and will have acceptable dimensional stability. For complex components or components having critical dimensional tolerance requirements, a fixtured post-cure may be required for adequate dimensional stability.

In view of the fact that RTM processes allow placement of fiber reinforcement materials, containing any of the various available fiber types or combinations thereof, in the mold cavity with minimal subsequent movement of the reinforcement preform during injection of the resin, the fiber reinforcement preform can be designed for optimum performance at minimum weight. That is, the fiber reinforcement preform can be designed and assembled with the most appropriate amount and type of reinforcement fiber (e.g., glass, graphite, aramid, etc., either chopped or continuous, random or oriented) in each portion of the preform. This yields a product of more optimum performance at reduced weight. Also, the low pressure required for resin injection often allows the use of less expensive presses and the use of tooling somewhat less costly than that employed in high pressure compression molding or thermoplastic stamping processes. Furthermore, there is the opportunity for significant assembly and tooling expense reduction where a significant degree of sub-part integration is achieved. That is, the RTM manufacture can integrate into a single, large, complex FRP component a number of sub-components which in metal would be manufactured separately and then assembled. In addition, the low pressures employed in RTM processes often enable larger structures to be produced than would be practical by other molding processes. Current compression molding processes, for example, are constrained by the cost and/or availability of sufficiently large presses.

Considerable effort is now being made to further advance the technology of RTM processes. Specifically, development is on-going in the areas of tooling fabrication, resin chemistry, control of resin flow and cure rates, and fabrication of complex preforms. With respect to fabrication of the preform, chopped, random fiber reinforcement material may be employed for its low cost and ease of use. One of the most versatile techniques for creating RTM-preforms, especially 3-dimensional preforms, is the so called spray-up process, wherein chopped glass roving or other chopped fiber reinforcement material is sprayed onto a forming mandrel from a chopper gun. Typically, the fibers are resin coated or a small amount of resin is introduced into the stream of chopped fibers to cause it to be retained on the screen. When the fibers accumulate to the proper weight or depth the resin can be cured to fix the shape of the resultant preform. Typically, the forming mandrel is a screen and vacuum is applied to the back of the screen to hold the fiber onto the screen as they accumulate and also to help ensure uniformity of fiber depth in the various areas of the screen. As the holes in the screen become covered by fiber, the remaining open areas tend to attract more fiber, causing a self-leveling action. This is capable of producing preforms of complex, near net shape with low waste.

A significant difficulty in the use of RTM processes, however, involves the fragile nature of the fiber reinforcement preforms. Preforms typically are handled and transported during manufacture and storage and during placement into the RTM molding tool cavity. Such handling and transport can cause damage, dislocation and loss of the reinforcement material of the preform. This can diminish the quality of the finished FRP product. Also, loose fibers can be a problem in the work area. In addition, when a preform is placed into a molding tool cavity, it must not extend beyond the desired seal or pinch off areas in the tool, since this could interfere with the mold closing and sealing properly. Particular care must be taken that the fibers of the reinforcement material do not extend from the preform into such areas or become dislodged and fall into such areas. This is a concern especially in the case of preforms, e.g. sprayed-up preforms as described above, in which chopped, randomly oriented fibers are employed. A covering is sometimes employed on a preform during shipment and handling, which covering is discarded prior to placement of the preform into the molding tool cavity. This fails to solve the problem, however, of reinforcement fibers being disrupted and lost during placement of the preform into the molding tool cavity. Thus, it fails to prevent loose fibers interfering with the closure and sealing of the molding tool cavity. It is an object of the present invention to provide an RTM preform comprising fiber reinforcement material (alone or with a foam or other core and with or without attachment fixtures and other features) wherein the reinforcement fibers are more durably held in position in the preform and better resist displacement and dislodgment. It is a further object to provide an RTM process employing such preform. It is one particular object of the invention to provide more durable preforms in which the fiber reinforcement material is less disrupted or dislodged by normal handling and transportation of the preform.

SUMMARY OF THE INVENTION

According to the present invention, a resin transfer molding preform is provided, which preform comprises a formation of fiber reinforcement material and a web in direct contact with, and encapsulating at least a portion of, the formation. The web of such preform may serve several useful functions. Most notably, it can protect the preform to reduce the dislocation and loss of fibers during transportation, storage and handling of the preform. Other functions and advantages of the web and of the preform of the invention generally will be apparent from the more detailed discussion of the invention which follows.

According to another aspect of the invention, a method is provide of making a resin transfer molding preform of a type within the scope of the preform invention disclosed immediately above. Specifically, the method of this aspect of the invention comprises:

spraying random chopped fiber reinforcement material onto a forming member while drawing a vacuum through the forming member;

applying a web over at least a portion of the formation while it remains on the forming member; and compressing the fiber reinforcement material under the web to reduce the loft thereof.

This aspect of the invention provides an effective and expeditious method for production of resin transfer molding preforms which provide the advantages discussed above. Further advantages and preferred features of this aspect of the invention will be appreciated from the detailed description thereof which follows.

According to another aspect of the invention, a resin transfer molding process for making FRP parts employs a fiber reinforcement material preform as first disclosed above. Such method comprises placing into a molding tool cavity a resin transfer molding preform comprising a formation of fiber reinforcement material and a web in direct contact with the formation and encapsulating at least a portion of such formation. Within the scope of this RTM aspect of the invention, a particularly advantageous RTM molding process for making FRP parts comprises the following steps:

(A) creating a fiber reinforcement material preform by spraying random chopped fiber reinforcement material onto a forming member while drawing a vacuum through such forming member;

(B) then applying a web over at least a portion of the formation while it remains on the forming member;

(C) then compressing the fiber reinforcement material under the web to reduce the loft thereof while it remains on the forming member;

(D) then removing the preform from the forming member and placing it into a molding cavity of a resin transfer molding tool; and (E) then substantially closing the molding tool and introducing resin into the molding cavity.

The resin transfer molding process aspects of the invention employ fiber reinforcement material preforms of the invention as described above and, therefore, enjoy the benefits and advantages of the preform aspect of the invention. Additional advantages and features of the resin transfer molding aspects of the invention will be more apparent from the detailed description which follows.

DESCRIPTION OF THE DRAWINGS

Additional objects, features and advantages of the invention will be more fully explained in connection with the accompanying drawings in which presently preferred embodiments of the invention are shown by way of illustration and not by way of limitation.

FIG. 1b is a perspective view of the resin transfer molding preform of FIG. 1a.

DETAILED DESCRIPTION OF PREFERRED EMBODIMENTS

Figure 2:
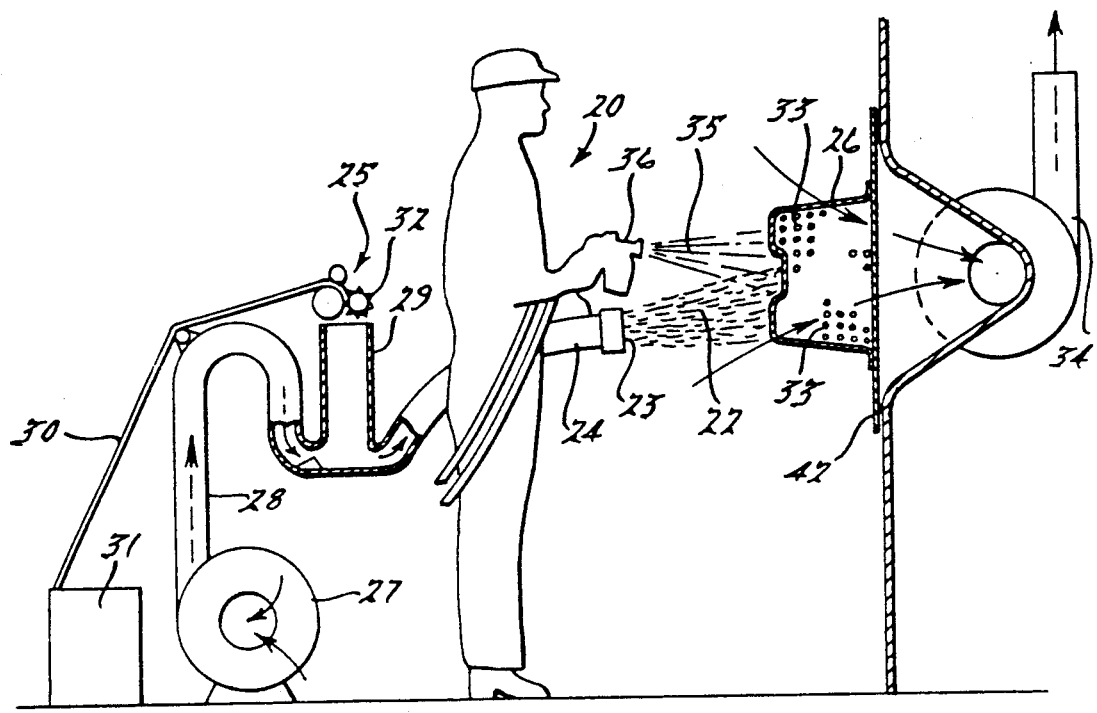
FIG. 2 is a side elevation view of apparatus in use for making a resin transfer molding preform in accordance with an embodiment of the RTM method aspect of the present invention.

As discussed above, in an RTM process a fiber reinforcement preform in one or more pieces is provided to fit the geometry of a desired FRP product. The preform is placed into the molding tool cavity, multi-piece preforms being either preassembled for placement into the molding tool cavity as a single unit or being assembled within the molding tool cavity. Once the preform is in the molding tool cavity the mold is closed and resin is introduced. Air may be vented from the cavity or, in some instances, a vacuum may be applied to the molding tool cavity to extract air therefrom.

Suitable preforms according to the present invention may or may not comprise a core. Foam cores used in RTM should be capable of withstanding molding pressure exerted by the resin without excess deformation. If the foam core deforms, excess resin will be pumped into the mold cavity resulting in higher cost and weight. Cores should also be stable at molding temperature and ultimately at service temperature. Unstable foam systems will expand in a heated mold causing compaction of the preform and flow restrictions. Cores that are not stable in service can expand and distort the finished component. thermal expansion difference between the laminate and the core must also be considered in some cases, particularly where laminate skins are there and the foam volume is large. In many applications the foam serves only as a tooling and fabrication aid. If the core is structural in nature, that is, is relied upon to supply a portion of the rigidity of the structure, a core with adequate shear and interfacial strength characteristics must be chosen. The long-term environmental and fatigue degradation of the laminate/core interface is known to be an important consideration in such a design.

The core may comprise any of the numerous core materials known to those skilled in the art such as, for example, structural and semi structural foam. Foam cores can be molded in a suitable molding tool having a desired configuration. While the selection of suitable foam material will depend largely on the application for which the core and the ultimate product are intended, generally preferred in view of its favorable costs and good physical properties are any of the numerous commercially available polyurethane foams. It will be understood, however, that suitable cores may comprise any of numerous alternative materials. Thus, for example, a suitable core may comprise a formed metal or plastic sheet or screen having the desired configuration. In appropriate applications one or more segments or the entire core may be removable from the product following the RTM molding processes. Thus, for example, where it is desired to render a certain portion of the product more readily crushable (i.e., less strong in the sense of being more readily crushable) than another portion of the product, the core from the former portion of the product may be removed. Suitable cores also include pressurized bladders, which optionally are deflatable and removable, and other types of mandrels, the primary consideration being that it act as a support for the fibrous reinforcement material during the resin transfer molding process. Additionally, as used herein, it will be understood that a core onto which continuous oriented fibers are wound, wrapped, woven, knitted, etc. may already comprise fibrous reinforcement material, either in the same section being overwrapped with the continuous oriented fibers and/or in different sections.

Suitable fibrous reinforcement materials include numerous materials known to the skilled of the art, among which are such commercially available materials as glass fibers, (both E and S-2), carbon fibers, aramid fibers (including KEVLAR (trademark)), polyester and the like and even wood or other organic fibers in certain applications. For use in the preforms of the present invention, fibrous reinforcement material can be used in various configurations including, for example, random chopped fiber, continuous random fiber, and oriented continuous fiber, for example, non-woven, woven, knitted, braided, etc. The reinforcement material must be capable of being preformed into the desired configuration. The economics required of the preforming process will be dependent upon the application. Aerospace and low volume applications typically can utilize cut and sew preforming. In a typical cut and sew preform, the general size and shape of each area is cut from a conformable material which then is fit to a part mold or model. Once fit by cutting, trimming and sewing, a final template is constructed and the actual reinforcement is cut and sewn on the preform. This process lends itself to easy translation from a finite element model to componentry but it is slow and labor intensive. For higher volume preforming, a faster process such as a stamping process may be used. Materials used for stamping are typically continuous strand random glass mats in which the reinforcement is in a swirled configuration. Several manufacturers produce materials for use in stamped preforms with a wide variety of physical properties available. Both thermoplastic and thermoset binder systems are available to retain the formed shape after stamping. Binder percent ranges generally from 4 to 8 percent by weight and can vary through the thickness of the preform if desired. The use of conformable mats is generally limited to applications requiring low tensile strength and stiffness. Glass content in the final part may be limited to approximately 50% by weight, since typically only marginal benefits, if any, are gained in overall physical properties above this amount. Damage of the glass reinforcement may occur during the preforming of higher glass levels.

Although rapid and convenient for preforming large structures, stamping of fully random materials is limited in its level of performance. To be more competitive with alternate materials with respect to weight and cost, composite structures will normally require the use of either oriented glass or some additional reinforcement type such as carbon or steel. It is possible to include limited amounts of conformable oriented materials with the random material and subsequently form the entire sandwich of materials by stamping.

Random fiber reinforcement material is available in the form of flat sheets or mats which can be cut and formed to fit, as needed, onto the surface of a core of foam or other material. Several layers of mat can be overlapped to provide greater depth of reinforcement material where needed and may be stitched together either prior to or at the time of attachment to a core, if any. For some applications, it will be required to employ flat sheets or mats of random glass which have been pre-shaped prior to attachment to a core. Such mats comprise not only the random glass but also small amounts of binder resin, either thermoset or, more typically, thermoplastic binder resin. The binder allows the sheet to take a desired configuration when heated and pressed in a suitable forming die. Continuous reinforcement fibers may be included in the mat in some cases to improve physical properties.

Spray up of reinforcement presents an additional option for the formation of preforms and, as further discussed below, is employed in one aspect of the present invention directed to making a preform. A perforated screen is made which conforms to the shape of the desired preform. Vacuum is applied to the rear of the screen and normally the screen is simultaneously rotated. A chopper system cuts reinforcement into short lengths and a binder spray is applied. Air is blown through a large chopping manifold to disperse and randomize the fibers and direct them to the preform screen. The vacuum behind the screen holds the fibers securely on the screen in the location where they first contact it. Once the desired thickness of reinforcement is achieved the chopped system is turned off and the preform and screen are transferred to a baking oven where the binder cures and rigidizes the preform. Once stabilized, the preform is cooled, removed from the screen, and trimmed if required. Spray up systems have demonstrated a capability to quickly manufacture large preforms.

Preform manufacturing systems may use a combination of automated technologies. Computerized braiding and filament winding combined with the three-dimensional screen spray may be used in fully integrated design and preform manufacturing systems.

Resins suitable for RTM processes are well known to the skilled of the art and include many commercially available resins. Suitable resins include both thermoplastics and, more typically, thermosetting resins. Most common are the epoxy, vinyl ester and polyester resins in view of their strength and performance characteristics and relatively favorable cost and availability. The resin must have the ability to fill the mold substantially complete, wet out the reinforcement and cure or freeze to a solid state with the desired physical properties. In high performance applications viscous epoxy resins can be molded using slow cycles. Where cycle time is critical, low viscosity vinyl ester, acrylamate, or RIM resins based on urethane chemistry can be injected very rapidly into the mold. Even the use of some thermoplastic resin systems such as polycarbonate or nylon may be feasible in certain applications. Additional suitable resins for use in the present invention will be apparent to the skilled in the art in view of the present disclosure.

Figure 1A:
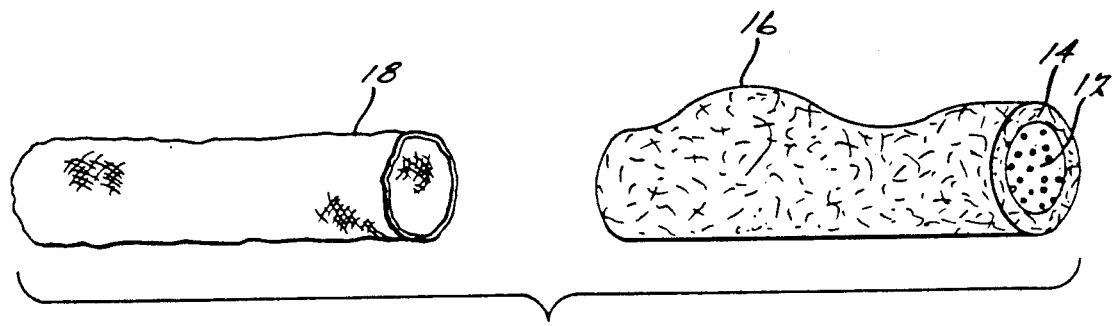
FIG. 1a is an exploded view of a resin transfer molding preform according to one embodiment of the present invention.
Figure 1B:
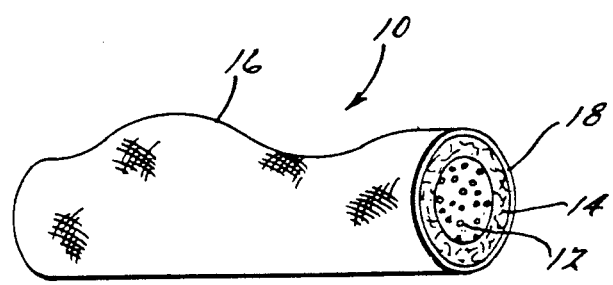

Referring now to the drawings, FIGS. 1a and 1b are seen to depict a resin transfer molding preform 10 having a generally cylindrical shape with certain surface irregularities. In FIG. 1a preform 10 is shown in an exploded view as two sub-components, specifically a foam core 12 and fiber reinforcement material 14 wrapped around the foam core 12. An irregularity 16 is seen in the configuration of the core and reinforcement material sub-component. Such irregularity may comprise, for example, additional thickness of fiber reinforcement material or a corresponding irregularity in the configuration of the core, or both. The second sub-component is a sleeve-like web or membrane 18 sized to fit snugly over the core and reinforcement material. In FIG. 1b the preform 10 is shown in assembled form with web 18 covering the core and reinforcement material. It can be seen that web 18 is sufficiently elastic or otherwise yielding to closely follow the contours of the core and reinforcement material including, for example, irregularity 16.

Webs suitable for use in the present invention include innumerable commercially available materials, many of which will be readily apparent to the skilled of the art in the light of the present disclosure. The web may comprise, for example, metallic screen, plastic screen or imperforate plastic sheet. Porous screens generally will be preferred where it is important to facilitate resin flow to the fiber reinforcement material. Amongst the various porous screen-type web materials, a metallic screen provides the further advantage of "RF screening". A metallic screen can be used in reducing the loft of the fiber reinforcement material by a simple stamping or press forming operation. The screen will retain the configuration into which it is pressed and thereby hold the fiber reinforcement material in the desired configuration.

Amongst the various solid sheets of plastic suitable for use as the web is included polyethylene sheeting of appropriate thickness and type. Thermoplastic polyester sheeting or screens also may be used for good adhesion between the web and the fibrous reinforcement material of the preform, especially where the RTM process temperature will reach the softening point of such thermoplastic. According to one preferred embodiment of the invention, the web comprises styrenic plastic which in the course of the RTM molding process entirely dissolves into the resin which is injected into the RTM molding cavity. Other suitable web materials include, for example, wood fiber, metal foils and pre-manufactured combinations of reinforcement and resin. Others will be apparent to the skilled of the art in view of the present disclosure. Stated generally, the web preferably is any material which provides good encapsulation of the fiber reinforcement material.

The web can be attached to the preform by any of numerous suitable means which would be apparent to the skilled of the art in view of the present disclosure. Thus, for example, the web can be stapled, adhesively bonded, etc. to the surface of the core. The most appropriate means of attaching the web will be dictated in part by the nature of the fiber reinforcement materials and the configuration and material of the web. In this regard, it should be understood that the term "encapsulate" as used herein with reference to the attachment of the web to the fiber reinforcement material formation means to cover one or more surfaces of the formation but not necessarily to entirely cover every surface thereof, the web being secured or fixed to the fiber reinforcement material. Thus, for example, in FIG. 3c the fiber reinforcement material formation is encapsulated by the web in the sense that the web overlies the exterior surface thereof. In FIG. 1b the web 18 is seen to encapsulate the fiber reinforcement material 14 in the sense that it forms a tight fitting sleeve thereover. Depending upon the particular part being produced, it may be suitable to leave the ends uncovered, as shown in FIG. 1b. In both these cases, the web being secured or fixed to the fiber material. In the case of FIG. 1b the attachment is by mechanical entrapment of the fiber reinforcement material by the web. The web in such cases preferably is sized to fit tightly over the fiber reinforcement material or is sufficiently elastic (or otherwise yielding) to form a snug fit thereover. Alternatively, in some applications a shrink wrap operation may be applicable, wherein shrinkable plastic film is applied to the fiber reinforcement material and thereafter heated to cause shrinkage of the plastic sheeting. Other materials and methods for securing the web to the fiber reinforcement material will be apparent to the skilled of the art in view of the present disclosure.

As an alternative to mechanical entrapment, the web may be adhesively adhered or bonded to the fiber reinforcement material. Thus, for example, where the fiber reinforcement material comprises curable resin, the adhesion between the web and the fiber reinforcement material may be achieved during curing of the fiber reinforcement material formation. This method is particularly suitable where the resin of the fiber reinforcement material is heat curable and will flow or soften during curing to wet the overlaying web. Alternatively, separate adhesive may be applied to the exterior of the fiber reinforcement material formation or to the inside surface of the web prior to its application over the fiber reinforcement material formation. Following the curing step or heat shrinking step, etc., the fiber reinforcement material is encapsulated by the web. FIG. 3c is equally illustrative of the preform both before and after such encapsulation step. Regardless whether the encapsulation of the fiber reinforcement material formation is by mechanical entrapment or adhesion or other means, it should be recognized that in the most advantageous embodiments of the invention, the web generally will encapsulate a major portion of the formation, e.g. as seen in FIG. 3b, or substantially the entire surface of the formation, e.g. as seen in FIG. 1b.

Figure 3A:
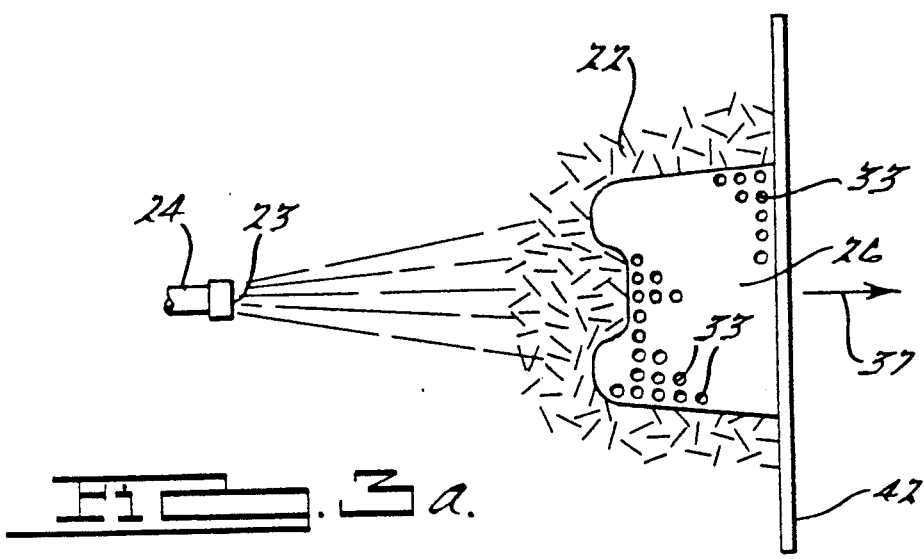
FIG. 3a through 3c are side elevation views of different stages in the production of a resin transfer molding preform in accordance with another embodiment of the RTM method aspect of the invention.
Figure 3B:
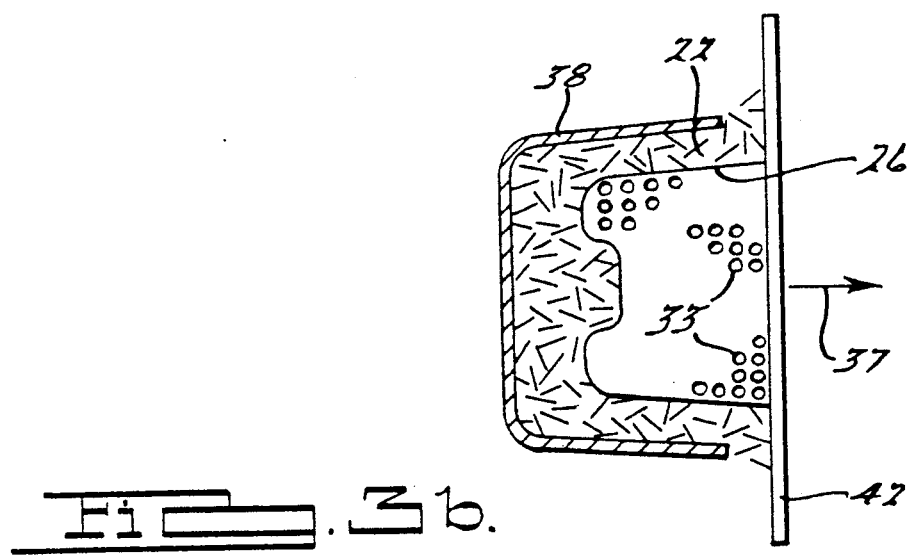
Figure 3C:
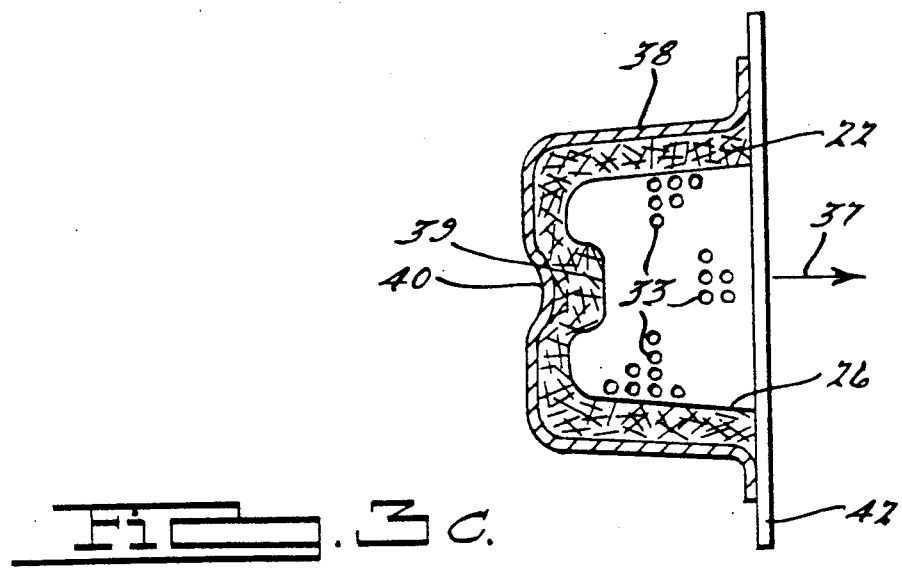

Regarding a method aspect of the invention whereby an RTM preform is fabricated, reference is made now to FIGS. 2 and 3a–3b of the drawings. Air impervious webs are particularly preferred for use in such method aspect of the invention, as described further below. According to such embodiments of the invention, a preform is fabricated by spraying random chopped fiber reinforcement material onto a forming member while drawing a vacuum through the forming member to retain the fiber reinforcement material thereon. With reference to FIG. 2, an operator 20 is seen directing a stream of random chopped fiber reinforcement material 22 from the outlet end 23 of a conduit 24 from a chopper/blower apparatus 25 toward a forming member 26. The chopper/blower unit 25 comprises a blower fan 27 blowing air through conduit 28 to a fiber feed station 29. Fiber material, preferably continuous fiberglass roving 30, is fed from supply station 31 to chopper mechanism 32 at which it is chopped, typically to about 2 or 3 inch lengths. The chopped fibers are entrained in the air flow through conduit 28 to conduit 24 and are directed from there toward forming member 26. Forming member 26 is seen to have perforations 33. A vacuum is created by blower 34 such that air is drawn into the forming member 26 through perforations 33. The random chopped fiber reinforcement material 22 is thereby drawn to and retained on the surface of the forming member 26. As one section of the forming member 26 is covered, a greater proportion of the air is drawn through any remaining uncovered or less covered perforations 33. In this way, a self-leveling of the fiber reinforcement material is achieved over the surface of the forming member 26.

In the preferred embodiment shown, a small quantity of resin 35 is sprayed simultaneously with the random chopped fiber reinforcement material 22. Specifically, resin 35 is seen to be sprayed from resin sprayer 36 toward the forming member 26. Preferably a light coating of resin is sprayed on the fibers sufficient, upon curing, to render the fiber reinforcement material preform (in conjunction with the encapsulating web) sufficiently form-stable to withstand normal handling, transportation, storage and the like. It will be appreciated by those skilled in the art in view of the present disclosure that fiber reinforcement material could be provided which already comprised a curable resin. In that case the separate application of resin while blowing the fiber at the forming mandrel would not be necessary.

Referring now to FIG. 3a, an enlarged view is seen of the forming member 26 of FIG. 2. The forming member 26 has been sprayed with random chopped fiber reinforcement material 22. Arrow 37 shows the direction of air flow through the forming member 26 generated by blower 34 (not shown in this view). The fiber reinforcement material 22 has high loft over the surface of the forming member 26. In FIG. 3b a web 38 has been placed over the formation of fiber reinforcement material 22 while still on the forming member 26. Vacuum generated via air flow 37 serves to hold web 38 in place over the fiber reinforcement material 22 and, as seen in FIG. 3(c) additional application of vacuum via air flow 37 (which may be intensified for this step) results in compression of the fiber reinforcement material 22 to reduce the loft of the fiber reinforcement material formation under web 38. Web 38 would, of course, be substantially air impervious and imperforate. In the embodiment shown in the drawings, the configuration of forming member 26 includes a surface contour 39. Web 38 is seen to have sufficiently compressed fiber reinforcement material 22 to at least partially follow such contour. Thus, depression 40 in web 38 at least partially follows contour 39 of the forming member 26. It will be appreciated by those skilled in the art that the degree to which the web follows the contours of the forming member will depend on such factors as the amount of fiber reinforcement material sprayed onto the forming member, the duration and intensity of vacuum applied, etc.

There are various alternatives to the application of vacuum for the purpose of compressing fiber reinforcement material under the web. One alternative method involves mechanical compression, e.g., between the forming member 26 and another appropriately shaped tool. An alternative method, is the use of a heat shrinkable web, mentioned above, comprising any of the various materials well known for the purpose of shrink wrapping. According to this alternative, after application of the web to the sprayed-up fiber reinforcement material on the forming member (corresponding to that stage of the method depicted in FIG. 3b) heat would be applied to the web and FRP formation to cause shrinkage of the web, thereby compressing the fiber reinforcement material under the web. According to preferred embodiments of the invention, the fiber reinforcement material 22 comprises heat curable resin and the method of the invention for fabrication of an RTM preform further comprises the step thermally curing the FRP formation with the web thereon. Where a heat shrinkable web is employed, the thermal curing of the fiber reinforcement material formation and the shrinking of the web can occur in the same heating step. In any case, a particularly. Preferred embodiment of the invention involves such heating step while the fiber reinforcement material formation remains on the forming member. In this way, the preform is given good structural stability while sandwiched between the forming member and the web. Thus, little or no disruption or dislocation of the fiber reinforcement material occurs by handling of the fiber reinforcement material formation in an uncured condition.

According to another method aspect of the invention, a resin transfer molding process is provided for making FRP parts. As disclosed above, the method comprises placing a fiber reinforcement material preform into the molding cavity of an RTM tool. The preform comprises a formation of fiber reinforcement material and a web in direct contact with such formation and encapsulating at least a portion thereof. After placement of the preform into the molding cavity the RTM mold is closed, or substantially closed, and resin is introduced into the cavity. Because the preform is encapsulated by the web, the disruption or dislodging of fibers is reduced or eliminated and, correspondingly, the problem of loose fibers interfering with the closure of the mold is reduced or eliminated. Also, it generally would be found that fewer loose fibers accumulate in the work area. The web also may make the preform easier to handle and in certain preferred embodiments lends structural durability to the preform.

According to certain embodiments of the invention, the encapsulating web may be stripped from the preform after its placement in the molding tool cavity. According to preferred embodiments, however, the web remains a part of the preform and ultimately a part of the FRP part. Other features of the RTM method aspect of the invention can be carried out in accordance with means well known to the skilled of the art. Thus, suitable materials for the tool are the same as those which have already been employed in RTM processes, e.g., epoxy tools, nickel shell tools, etc. Sealing of the mold can be accomplished by known methods including, for example, "pinch off" techniques or the use of "O-ring" designs. Similarly, selection of suitable mold releases will be within the ability of those skilled in the art. Mold releases must be carefully selected when using epoxy tools, and in the practice of the present invention the mold releases must be likewise compatible with the web of the preform. Selection of suitable mold release agents will be within the ability of those skilled in the art in the light of the present disclosure. Venting of the tooling generally will be required to allow air to escape during resin injection. Vents may be simply small gaps in the seal of the molding tool or may be tubes or the like inserted through the tool surface. In the present invention where a web encapsulates all or part of the surface of the preform, the selection of suitable venting may be influenced by the path of the air flow from under the web as resin infiltrates the fiber reinforcement material. Here again, it will be within the ability of those skilled in the art to provide suitable venting. Standard liquid resin handling equipment is generally suitable for use in the RTM method aspect of the invention including, for example, hand-held gun injection systems and fixed injection nozzle systems.

While the invention has been described in detail with respect to certain presently preferred features and embodiments, it will be understood by those skilled in the art in view of the present disclosure that various changes and modifications may be made without departing from the scope of the invention. The claims appended hereto are intended to cover all such changes and modifications.

We claim:

1. A resin transfer molding process for making FRP parts, which process comprises placing a fiber reinforcement material preform into a molding cavity of a resin transfer molding tool, substantially closing said molding tool and introducing resin into said cavity, wherein said preform comprises a fiber reinforcement material formation and a web in direct contact with said formation and encapsulating at least a portion of said formation, wherein said web is soluble in said resin.

2. The resin transfer molding process of claim 1 wherein said web substantially entirely encapsulates said fiber reinforcement material formation.

3. The resin transfer molding process of claim 1 wherein said web is adhered to said formation.

4. A resin transfer molding process for making FRP parts employing a fiber reinforcement material, which process comprises the following steps:
    A) creating a formation of fiber reinforcement material by spraying random chopped fiber reinforcement material onto a forming member while drawing a vacuum through said forming member to retain said fiber reinforcement material thereon;
    B) then applying a resin soluble web over at least a portion of said formation while it remains on said forming member;
    C) then compressing said fiber reinforcement material under said web to reduce the loft of said formation;
    D) then removing said preform from said forming member and placing it into a molding cavity of a resin transfer molding tool; and
    E) then substantially closing said molding tool and introducing resin into said molding cavity.

5. The process of claim 4 wherein said fiber reinforcement material comprises heat curable resin and said process further comprises, between steps (C) and (D), heating the web covered fiber reinforcement material while applying vacuum through said forming member to cure said resin.

6. The process of claim 4 further comprising, in step (D), removing said web from said preform.

7. The method of claim 4 wherein said web comprises mold release agent on a surface adjacent a molding tool cavity surface.

* * * * *